US012654617B2

(12) United States Patent
Doehlert et al.

(10) Patent No.: US 12,654,617 B2
(45) Date of Patent: Jun. 16, 2026

(54) EXTERNAL MIRROR APPARATUS FOR A MOTOR VEHICLE, MOTOR VEHICLE

(71) Applicant: Volkswagen Aktiengesellschaft, Wolfsburg (DE)

(72) Inventors: Steffen Doehlert, Magdeburg (DE); Uwe Luebben, Ostercappeln (DE); Inga Korthals, Bad Bodenteich (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 335 days.

(21) Appl. No.: 18/238,217

(22) Filed: Aug. 25, 2023

(65) Prior Publication Data

US 2024/0067089 A1 Feb. 29, 2024

(30) Foreign Application Priority Data

Aug. 25, 2022 (DE) ..................... 10 2022 208 824.7

(51) Int. Cl.
B60R 1/06 (2006.01)
B60R 1/12 (2006.01)

(52) U.S. Cl.
CPC .................. B60R 1/06 (2013.01); B60R 1/12 (2013.01); *B60R 2001/1215* (2013.01)

(58) Field of Classification Search
CPC ..... B60R 1/06; B60R 1/12; B60R 2001/1215; B60K 35/22; B60K 35/60; B60K 11/06

USPC .......................................... 359/845, 871–878
See application file for complete search history.

(56) References Cited

U.S. PATENT DOCUMENTS 4,898,458 A * 2/1990 McDonald ............ B60R 1/0602
                                                              359/509
6,386,712 B1 5/2002 Warner

FOREIGN PATENT DOCUMENTS

| CN | 212373258 U | 1/2021 | |
| DE | 4039484 C2 | 11/1993 | |
| DE | 10108874 A1 | 9/2002 | |
| DE | 19825705 B4 | 4/2008 | |
| KR | 20110010446 U | * 11/2011 | ........... B60R 1/1207 |

* cited by examiner

*Primary Examiner* — Jessica M Merlin
(74) *Attorney, Agent, or Firm* — Muncy, Geissler, Olds & Lowe, P.C.

(57) ABSTRACT

An external mirror apparatus for a motor vehicle, including a mirror housing and including at least one flow guiding element arranged on an outside of the mirror housing for the purpose of influencing an air flow at the external mirror apparatus. It is provided that a display apparatus is arranged in a recess of the mirror housing, in particular for a warning device of the motor vehicle, and the flow guiding element is arranged next to the display apparatus as an eddy generator and has a flow separation edge, which extends at least essentially in parallel to the display apparatus and projects away from the mirror housing.

16 Claims, 2 Drawing Sheets

EXTERNAL MIRROR APPARATUS FOR A MOTOR VEHICLE, MOTOR VEHICLE

This nonprovisional application claims priority under 35 U.S.C. § 119(a) to German Patent Application No. 10 2022 208 824.7, which was filed in Germany on Aug. 25, 2022, and which is herein incorporated by reference.

BACKGROUND OF THE INVENTION

Field of the Invention

The present invention relates to an external mirror apparatus for a motor vehicle, including a mirror housing and including at least one flow guiding element arranged on an outside of the mirror housing for the purpose of influencing an air flow at the external mirror apparatus.

The invention also relates to a motor vehicle including an external mirror apparatus of this type.

Description of the Background Art

External mirror apparatuses of the type mentioned at the outset are known from the prior art. For example, a vehicle external mirror housing is known from the patent specification DE 198 25 705 B4, which has at least one connecting channel between its outside and inside over which an airstream passes, a projection being assigned to the connecting channel as a flow separation edge in front of its opening point on a housing outside in the direction of the airstream. This is intended to avoid the formation of wind noises in that the flow separation edge ensures that the air does not flow into the channel as a result of flow separation but instead is guided along the outside of the housing.

SUMMARY OF THE INVENTION

It is therefore an object of the present invention to provide an improved external mirror apparatus, which ensures the advantageous air guidance for structural elements arranged on or in the external mirror apparatus.

The object of the invention is achieved by an external mirror apparatus in that a display apparatus is arranged in a recess of the mirror housing, in particular for a warning device of the motor vehicle, and the flow guiding element is arranged next to the display apparatus as an eddy generator and has a flow separation edge, which extends at least essentially in parallel to the display apparatus and projects away from the mirror housing. Due to such an arrangement of the display apparatus and flow guiding element, a particularly advantageous possibility is provided for influencing the air flow, in which undesirable wind noises in the region of the display apparatus are reliably avoided or at least largely reduced. The flow guiding element is arranged next to the display apparatus as an eddy generator in such a way that, when it is impinged upon by an air flow, the air flow is swirled to at least largely avoid wind noises. In particular, the flow guiding element is arranged or formed on the mirror housing in such a way that it is upstream from the display apparatus in a normal flow direction, i.e., it is impinged upon by the air flow before the air flow reaches the display apparatus. When the external mirror apparatus is used as intended, the normal flow direction runs counter to the straight-ahead direction of travel of the motor vehicle when traveling forward, i.e., from the front of the vehicle to the back of the vehicle (or from the vehicle front to the vehicle rear). The flow separation edge is arranged transversely to the normal flow direction. The air flow is separated from the flow guiding element by the flow separation edge, and a laminar flow along the flow guiding element present up to that point is influenced in a turbulent manner, i.e., swirled. Wind noises are advantageously at least greatly reduced thereby, as described above. The flow guiding element, together with its flow separation edge, acts as a kind of interference contour to prevent or at least reduce acoustic noises. A structurally particularly simple approach is thus provided for avoiding or reducing wind noises, in which, in particular, the geometric design of the display apparatus is otherwise irrelevant, as long as it is ensured that the display apparatus extends at least essentially in parallel to the flow separation edge, and the flow separation edge projects at least farther away from the mirror housing than the display apparatus. The display apparatus therefore also projects, in particular, away from the mirror housing, but to a lesser degree than the flow separation edge. The display apparatus is preferably arranged in the recess in such a way that it terminates flush with the outside or the surface of the mirror housing, the display apparatus particularly preferably being offset to the inside with respect to the outside or the surface by a predefined amount (i.e., toward the interior of the mirror housing), for example offset to the inside by 0.3 mm with a tolerance of ±0.2 mm, i.e., at least 0.1 mm and no more than 0.5 mm. The warning device is, in particular, an integral part of a driver assistance system of the motor vehicle, for example a lane change indicator or a blind spot warning device. The display apparatus is then designed, in particular, to output and/or to display corresponding graphical information, for example recommendations for a lane change or warning information for objects situated in a blind spot of the motor vehicle, in particular other road users.

The flow separation edge may have a length which corresponds at least to a length of the display apparatus, in particular, projects beyond the length of the display apparatus by a predefined amount at least on one end. A projection of this type results in the advantage of ensuring that the air flow is separated and swirled along the flow separation edge over the entire length of the display apparatus. The display apparatus is thus completely encompassed or covered, for example assuming the normal flow direction described above, the length of the display apparatus and/or the length of the flow separation edge running transversely to the flow direction. The two lengths are particularly preferably in parallel to each other. The flow separation edge preferably projects beyond the display apparatus at both ends in terms of its length, the flow separation edge projecting beyond the display apparatus, in particular, by a first predefined amount at a first end and by a second predefined amount at a second end.

The display apparatus can fill the recess completely. The display apparatus is thus arranged in the recess in a manner which fills the recess completely. A complete filling of the recess in this way advantageously ensures that the display apparatus is securely arranged in the recess and no openings which may negatively influence the air flow remain. In particular, the display apparatus is latched in the recess, preferably in a detachable manner. For this purpose, the recess and the display apparatus have, for example, suitable latching means, for example clip connections. The display apparatus is preferably arranged between the flow guiding element and a mirror element situated, in particular, in an additional recess of the mirror housing. The display apparatus is arranged, in particular, in a region of the mirror housing assigned to a vehicle interior of the motor vehicle, so that it is visible at least or exclusively to a vehicle occupant, in particular the driver, of the vehicle.

The flow guiding element can be designed to form a single piece with the mirror housing. A one-piece design of this type results in the advantage that the external mirror apparatus is particularly easy to manufacture. Alternatively, the flow guiding element is connected to the mirror housing in a form-fitting or materially bonded manner, for example glued or welded.

The flow guiding element can be wedge-shaped or fin-shaped. Due to such a geometric design of the flow guiding element, it is advantageously ensured that the air flow is influenced as desired. As described above, the air flow is first guided along the flow guiding element and separates at the flow separation edge. Assuming the normal flow direction described above, the flow guiding element has the shape of a wedge or a fin, in particular in a section along the flow direction.

The flow guiding element can have an inflow surface oriented at a predefined angle with respect to a surface or outside of the mirror housing in such a way that the inflow surface has an increasing height in the direction of the display apparatus, and the flow separation edge is arranged at the highest point of the inflow surface. Such a geometric design of the flow guiding element results in the advantage that the air flow, as described above, flows along the inflow surface without premature separation and separates only at the highest point of the inflow surface. Assuming the normal flow direction described above, the inflow surface is situated upstream from the flow separation edge in the flow direction. A particularly advantageous air guidance is thus ensured.

The mirror housing can transition steplessly into the inflow surface. Due to a stepless transition of this type, it is advantageously ensured that the air flow lies securely against the inflow surface at all times when the external mirror apparatus is used as intended and does not separate prematurely from the mirror housing and/or the inflow surface, but is swirled only at the flow separation edge, as described above. In particular, the inflow surface has one or multiple roundings in the transition from the mirror housing and/or the flow separation edge.

The flow guiding element can have an angle of at least 90° between the inflow surface and an end face of the flow guiding element facing the display apparatus in the region of the flow separation edge. An angle of this type results in the advantage that the air flow is reliably separated and swirled at the flow separation edge. Depending on a preferred angle of the end face with respect to the outside of the mirror housing which, for example, is advantageous for manufacturing, it is alternatively provided that the end face forms an acute angle with the inflow surface. In particular, the end face has one or multiple roundings, similarly to the above description in relation to the inflow surface, so that the end face transitions steplessly into the mirror housing. Assuming the normal flow direction described above, the end face is arranged such that it is situated behind the flow separation edge in the flow direction.

The flow separation edge can have a distance of 0.5 mm to 4.5 mm perpendicular to surface or the outside of the mirror housing. Due to a distance of this type, it is advantageously ensured that the air flow is sufficiently separated and swirled to at least greatly reduce wind noises, as described at the outset.

The flow separation edge or an edge of the flow guiding element facing the display apparatus can have a distance of 5 mm to 10 mm up to an outer edge of the display apparatus on the surface or outside of the mirror housing. A distance of this type results in the advantage that the air flow is sufficiently separated and swirled to at least greatly reduce wind noises, as described at the outset. Assuming the normal flow direction described above, the edge facing the display apparatus is arranged so as to be situated behind the flow separation edge in the flow direction, and the outer edge of the display apparatus is arranged to follow the flow direction.

A ratio of a perpendicular distance from the flow separation edge to the surface or outside of the mirror housing to a distance of the flow separation edge or an edge of the flow guiding element facing the display apparatus on the surface or outside of the mirror housing up to an outer edge of the display apparatus is in a range between 1 to 20 and 1 to 1. Due to a ratio of this type, it is advantageously ensured that the air flow is sufficiently separated and swirled to at least greatly reduce wind noises, as described at the outset. Assuming the normal flow direction described above, the edge facing the display apparatus is arranged so as to be situated behind the flow separation edge in the flow direction, and the outer edge of the display apparatus is arranged to follow the flow direction.

Further, a motor vehicle is provided that has the external mirror apparatus according to the invention. The advantages already mentioned are also derived therefrom. The motor vehicle may include at least one external mirror apparatus according to the invention that can be arranged on both sides of the vehicle, i.e., one left external mirror apparatus and one right external mirror apparatus, which are each designed according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figures 1, 2:
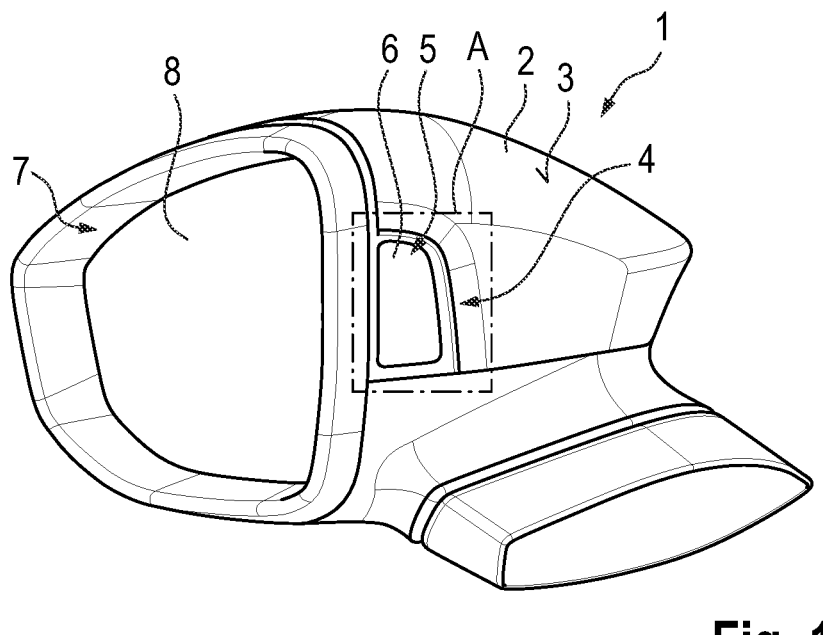
FIG. 1 shows an advantageous external mirror apparatus for a motor vehicle.
FIG. 2 shows a detailed view of the external mirror apparatus from FIG. 1 in the region of a display apparatus and a flow guiding element.

FIG. 1 shows an external mirror apparatus 1 for a motor vehicle, which is not illustrated in greater detail. External mirror apparatus 1 includes a mirror housing 2. Mirror housing 2 is or may be fastened to an outside of the motor vehicle by means, which are not illustrated in the present case. A flow guiding element 4 is arranged on an outside 3 of mirror housing 2 for the purpose of influencing an air flow at external mirror apparatus 1.

A display apparatus 6 is arranged in a recess 5 of mirror housing 2. Display apparatus 6 is assigned, in particular, to a warning device of the motor vehicle, the warning device being, for example, part of a driver assistance system of the motor vehicle. Mirror housing 2 also has a further recess 7, in which a mirror element 8 is arranged.

In the present case, display apparatus 6 is arranged between mirror element 8 and flow guiding element 4 in such a way that it faces a vehicle interior of the motor vehicle and is visible at least to a vehicle occupant when external mirror apparatus 1 is used as intended or mounted as intended on the motor vehicle.

External mirror apparatus 1 will now be described in detail below with reference to FIG. 2. FIG. 2 shows a detailed view of FIG. 1 in the region of section A drawn with a dashed line in FIG. 1.

It is apparent in FIG. 2 that flow guiding element 4 is arranged next to display apparatus 6 as an eddy generator and has a flow separation edge 9. Flow separation edge 9 extends at least essentially in parallel to display apparatus 6 and projects away from mirror housing 2. Flow separation edge 9 has a first length $L_1$, which corresponds at least to a second length $L_2$ of display apparatus 6. In the present case, first length $L_1$ of flow separation edge 9 extends beyond second length $L_2$ of display apparatus 6 at both ends by a predefined first amount $M_1$ and by a predefined second amount $M_2$, respectively.

In the present case, display apparatus 6 fills recess 5 completely, and flow guiding element 4 is designed to form a single piece with mirror housing 2. Flow guiding element 4, in particular its geometric shape, will be described in greater detail with reference to FIG. 3.

Figure 3:
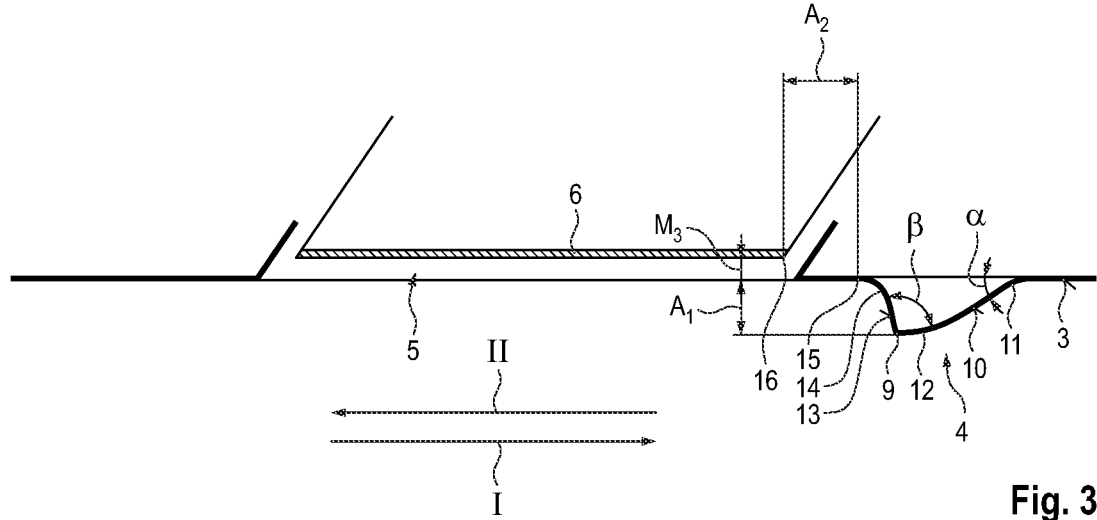
FIG. 3 shows a sectional view of a plane of intersection drawn in FIG. 2.

FIG. 3 shows a sectional view along a plane of intersection B-B drawn in FIG. 2. Flow guiding element 4 is provided with a fin-shaped design in the present case. It has an inflow surface 10 oriented at a predefined first angle α with respect to a surface or outside 3 of mirror housing 2 in such a way that inflow surface 10 has an increasing height in the direction of display apparatus 6. Flow separation edge 9 is arranged at the highest point of inflow surface 10.

In the present case, mirror housing 2 or outside 3 of mirror housing 2 transitions steplessly into inflow surface 10. In the present case, inflow surface 10 does not have a constant inclination but instead has a first transition 11 with a predefined first rounding and a second transition 12 with a predefined second rounding, at which the inclination changes gradually in each case, so that it is advantageously ensured that an air flow lies securely on inflow surface 10 at all times.

In the region of flow separation edge 9, flow guiding element 4 furthermore has a second angle β of at least 90°, greater than 90° in the present case, between inflow surface 10 and an end face 13 of flow guiding element 4 facing display apparatus 6. In the present case, end face 13 also does not have a constant inclination but instead at least one third transition 14 with a predefined rounding, at which the inclination does not change abruptly but rather gradually until end face 13 runs onto outside 3 of mirror housing 2.

Flow separation edge 9 has a first distance $A_1$ of at least 0.5 mm perpendicular to the surface or outside 3 of mirror housing 2. In particular, distance $A_1$ is within a range of 0.5 mm to 4.5 mm.

In addition, flow separation edge 9 or, in the present case, an edge 15 of flow guiding element 4 facing display apparatus 6 and situated in the region of third transition 14 on the surface or outside 3 of mirror housing 2, has a second distance $A_2$ of at least 5 mm to an outer edge 16 of display apparatus 6. In particular, distance $A_2$ is within a range of 5 mm to 10 mm. A ratio of distances $A_1$ and $A_2$ with respect to each other is preferably in a range between 1 to 20 and 1 to 1.

In the present vase, display apparatus 6 is offset to the inside by an amount $M_3$ with respect to outside 3 or the surface (i.e., into the interior of mirror housing 2), for example offset to the inside by 0.3 mm with a tolerance of ±0.2 mm, i.e., at least 0.1 mm and no more than 0.5 mm.

Finally, a forward driving direction I of the motor vehicle is drawn in FIG. 3, from which a normal flow direction II results in the opposite direction. When the motor vehicle is operated as intended and travels in the forward direction, an air flow flows over flow guiding element 4, which acts as an eddy generator, the air flow initially being guided along and lying against inflow surface 10 until the air flow separates at flow separation edge 9 and is swirled thereby.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An external mirror apparatus for a motor vehicle, the apparatus comprising:
   a mirror housing;
   at least one flow guiding element arranged on an exterior surface of the mirror housing to influence an air flow at the external mirror apparatus;
   a first recess;
   a display apparatus arranged in the first recess of the mirror housing for a warning device of the motor vehicle;
   a second recess; and
   a mirror element arranged in the second recess of the mirror housing,
   wherein the at least one flow guiding element is arranged adjacent to the display apparatus as an eddy generator and has a flow separation edge, which extends at least essentially in parallel to the display apparatus, and the at least one flow guiding element projecting away from the exterior surface of the mirror housing.

2. The external mirror apparatus according to claim 1, wherein the flow separation edge has a length, which corresponds at least to a length of the display apparatus or projects beyond the length of the display apparatus by a predefined amount at least at one end.

3. The external mirror apparatus according to claim 1, wherein the display apparatus fills the first recess completely.

4. The external mirror apparatus according to claim 1, wherein the at least one flow guiding element is formed as a single piece with the mirror housing.

5. The external mirror apparatus according to claim 1, wherein the at least one flow guiding element is wedge-shaped or fin-shaped.

6. The external mirror apparatus according to claim 1, wherein the at least one flow guiding element has an inflow surface oriented at a predefined angle with respect to an exterior surface of the mirror housing such that the inflow surface has an increasing height in the direction of the display apparatus, and wherein the flow separation edge is arranged at a highest point of the inflow surface.

7. The external mirror apparatus according to claim 6, wherein exterior surface of the mirror housing transitions steplessly into the inflow surface.

8. The external mirror apparatus according to claim 6, wherein, in a region of the flow separation edge, the at least one flow guiding element has an angle of at least 90° between the inflow surface and an end face of the at least one flow guiding element facing the display apparatus.

9. The external mirror apparatus according to claim 6, wherein in a direction substantially perpendicular to the exterior surface of the mirror housing, the flow separation edge has a distance of 0.5 mm to 4.5 mm to the exterior surface of the mirror housing.

10. The external mirror apparatus according to claim 9, wherein an edge of the at least one flow guiding element, that faces the display apparatus and is provided at the exterior surface of the mirror housing, has a distance of at least 5 mm to 10 mm to an outer edge of the display apparatus.

11. The external mirror apparatus according to claim 10, wherein a ratio of the substantially perpendicular distance from the flow separation edge to the exterior surface of the mirror housing to a distance of the edge of the flow guiding element facing the display apparatus to the outer edge of the display apparatus is in a range between 1 to 20 and 1 to 1.

12. The external mirror apparatus according to claim 1, wherein the first recess is provided on a side of the mirror housing facing an interior of the motor vehicle, such that the display apparatus arranged in the first recess faces the interior of the motor vehicle.

13. The external mirror apparatus according to claim 1, wherein the first recess is provided on a different side of the mirror housing than the second recess.

14. The external mirror apparatus according to claim 1, wherein the flow guiding element is an elongated protrusion that protrudes from the exterior surface of the mirror housing.

15. The external mirror apparatus according to claim 14, wherein the flow separation edge is provided at a highest point of elevation of the elongated protrusion, and wherein the elongated protrusion is non-symmetrical, such that an angle of inclination of side surfaces of the elongated protrusion, that extend from opposing sides of the flow separation edge to the exterior surface of the mirror housing, are different from one another.

16. A motor vehicle comprising at least one external mirror apparatus according to claim 1.

\* \* \* \* \*